(12) United States Patent
Salgado

(10) Patent No.: US 8,441,660 B2
(45) Date of Patent: May 14, 2013

(54) APPARATUS AND METHOD FOR PRINT JOB REDIRECTION

(75) Inventor: David Salgado, Victor, NY (US)

(73) Assignee: Xerox Corporation, Norwalk, CT (US)

( * ) Notice: Subject to any disclaimer, the term of this patent is extended or adjusted under 35 U.S.C. 154(b) by 551 days.

(21) Appl. No.: 12/748,940

(22) Filed: Mar. 29, 2010

(65) Prior Publication Data

US 2011/0235090 A1    Sep. 29, 2011

(51) Int. Cl.
*G06K 15/00* (2006.01)
*G06F 3/12* (2006.01)

(52) U.S. Cl.
USPC .......................................... 358/1.14; 358/1.15

(58) Field of Classification Search ................. 358/1.14, 358/1.15; 399/81
See application file for complete search history.

(56) References Cited

U.S. PATENT DOCUMENTS

| | | | |
|---|---|---|---|
| 6,809,831 B1 * | 10/2004 | Minari | 358/1.15 |
| 7,623,256 B2 | 11/2009 | Ciriza et al. | |
| 8,134,724 B2 * | 3/2012 | Kephart et al. | 358/1.15 |
| 2005/0030574 A1 * | 2/2005 | McVey et al. | 358/1.14 |

* cited by examiner

*Primary Examiner* — Twyler Haskins
*Assistant Examiner* — Fred Guillermety
(74) *Attorney, Agent, or Firm* — Ronald E. Prass, Jr.; Prass LLP

(57) ABSTRACT

An apparatus and method for print job redirection is disclosed. The method can include providing print job forwarding preference options. The print job forwarding preference options can include options for print job preferences based on printing device capabilities. The method can include receiving print job forwarding preferences at a printing device. The print job forwarding preferences can include at least one mandatory print job preference that specifies a mandatory printing device capability for a specific print job and at least one desirable print job preference that specifies a desirable printing device capability for the specific print job. The method can include determining whether the specific print job requires forwarding from the printing device to another printing device. The method can include forwarding the specific print job for printing if the specific print job requires forwarding.

19 Claims, 5 Drawing Sheets

APPARATUS AND METHOD FOR PRINT JOB REDIRECTION

BACKGROUND

Disclosed herein is an apparatus and method for print job redirection.

Presently, in digital printing, a plurality of printing devices, such as ink-jet printers or xerographic "laser printers," are selectably available for use by computers or other sources of image data over a network. The sources of image data can have different requirements for different print jobs sent to different printing devices. For example, a user may require a certain type or size of paper for a given print job. The user will then send the print job to a printing device that is equipped with the desired paper type or size. Different print jobs may have other requirements, such as paper color, stapling, print quality, color printing, color correction, or other printing device feature options.

Unfortunately, when a user goes to a printing device to retrieve their printout, the user may find a problem at the printing device. For example, the printing device may be down, there may be a paper jam in the device, or there may be many print jobs ahead of the user's print job. The user may then desire to forward their print job to another printing device. The user then encounters a further problem in that the user will not know which other printing devices are available and will not know which features are offered by the other printing devices. Thus, the user will not be able to determine which other printing devices properly satisfy the requirements of their print job.

Thus, there is a need for an apparatus and method for print job redirection.

SUMMARY

An apparatus and method for print job redirection is disclosed. The method can include providing print job forwarding preference options. The print job forwarding preference options can include options for print job preferences based on printing device capabilities. The method can include receiving print job forwarding preferences at a printing device. The print job forwarding preferences can include at least one mandatory print job preference that specifies a mandatory printing device capability for a specific print job and at least one desirable print job preference that specifies a desirable printing device capability for the specific print job. The method can include determining whether the specific print job requires forwarding from the printing device to another printing device. The method can include forwarding the specific print job for printing if the specific print job requires forwarding.

BRIEF DESCRIPTION OF THE DRAWINGS

In order to describe the manner in which advantages and features of the disclosure can be obtained, a more particular description of the disclosure briefly described above will be rendered by reference to specific embodiments thereof, which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

Figure 1:
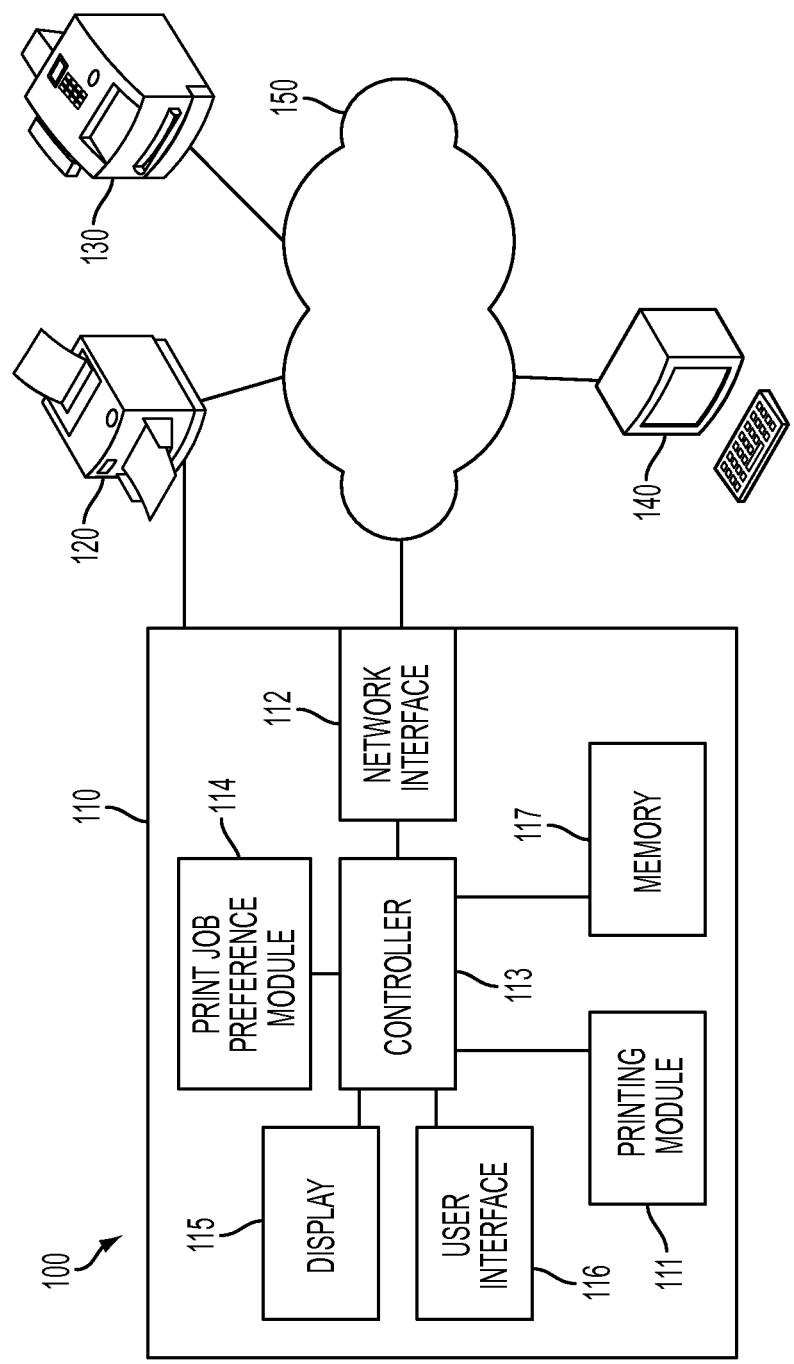
FIG. 1 is an exemplary illustration of a system according to a possible embodiment.

The embodiments include a method for print job redirection in a printing device including a printing module configured to generate an image on media, a network interface configured to communicate with at least one other printing device, and a controller configured to control operations of the printing device. The method can include providing print job forwarding preference options. The print job forwarding preference options can include options for print job preferences based on printing device capabilities. The method can include receiving print job forwarding preferences at the printing device. The print job forwarding preferences can include at least one mandatory print job preference that specifies a mandatory printing device capability for a specific print job and at least one desirable print job preference that specifies a desirable printing device capability for the specific print job. The method can include determining whether the specific print job requires forwarding from the printing device to another printing device. The method can include forwarding the specific print job for printing if the specific print job requires forwarding.

The embodiments further include an apparatus for print job redirection. The apparatus can be a printing device that can include a printing module configured to generate an image on media. The printing device can include a network interface configured to communicate with at least one other printing device. The printing device can include a controller coupled to the printing module and the network interface, the controller configured to control operations of the printing device. The printing device can include a print job preference module coupled to the controller. The print job preference module can be configured to provide print job forwarding preference options. The print job forwarding preference options can include options for print job preferences based on printing device capabilities. The print job preference module can be configured to receive print job forwarding preferences. The print job forwarding preferences can include at least one mandatory print job preference that specifies a mandatory printing device capability for a specific print job and at least one desirable print job preference that specifies a desirable printing device capability for the specific print job. The controller can be configured to determine whether the specific print job requires forwarding from the printing device to another printing device and configured to forward the specific print job for printing if the specific print job requires forwarding.

The embodiments further include computer-readable medium including a computer-usable data carrier storing instructions. The instructions, when executed by a controller, can cause the controller to control a printing device for print job redirection. The instructions can control a printing device by providing print job forwarding preference options, where the print job forwarding preference options include options for print job preferences based on printing device capabilities. The instructions can control a printing device by receiving print job forwarding preferences at the printing device. The print job forwarding preferences can include at least one mandatory print job preference that specifies a mandatory printing device capability for a specific print job and can include at least one desirable print job preference that specifies a desirable printing device capability for the specific print job. The instructions can control a printing device by determining whether the specific print job requires forwarding from the printing device to another printing device. The instructions can control a printing device by forwarding the specific print job for printing if the specific print job requires forwarding.

FIG. 1 is an exemplary illustration of a system 100. The system can include printing devices 110, 120, and 130, at least one user terminal 140, and at least one network 150. The printing devices 110, 120, and 130 may be printers, multi-function media devices, xerographic machines, ink jet printers, or any other devices that generate an image on media. The printing device 110 can include a printing module 111 configured to generate an image on media. For example, the printing module 111 can generate an image on media by affixing marking material to the media. The marking material can be toner, solid ink jet ink, liquid ink jet ink, or any other marking material that can generate an image on media. Media can be paper, plastic, labels, transparencies, or any other media that receive an image. The printing device 110 can include a network interface 112 configured to communicate with at least one other printing device, such as the printing devices 120 and 130. The network interface 112 can directly communicate with another printing device 120 or can communicate with another printing device 130 over a network, such as the network 150. The printing device 110 can include a controller 113 coupled to the printing module 111 and the network interface 112. The controller 113 can be configured to control operations of the printing device 110. The printing device 110 can include a memory 117 coupled to the controller 113. The memory 117 may include a random access memory, a read only memory, an optical memory, a hard drive, a thumb drive, a floppy disk, a compact disk, or any other memory that can be coupled to a printing device.

The printing device 110 can include a print job preference module 114 coupled to the controller 113. The print job preference module 114 can be coupled to the controller 113, can reside within the controller 113, can reside within the memory 117, can be an autonomous module, can be software, can be hardware, or can be in any other format useful for a module on printing device 110. The print job preference module 114 can be configured to provide print job forwarding preference options. The print job forwarding preference options can include options for print job preferences based on printing device capabilities. The print job preference module 114 can be configured to receive print job forwarding preferences. The print job forwarding preferences can include at least one mandatory print job preference that specifies a mandatory printing device capability for a specific print job. The print job forwarding preferences can include at least one desirable print job preference that specifies a desirable printing device capability for the specific print job. The controller 113 can be configured to determine whether the specific print job requires forwarding from the printing device 110 to another printing device 120 or 130. The controller 113 can be configured to forward the specific print job for printing to another printing device 120 or 130 if the specific print job requires forwarding.

The printing device 110 can include a display 115 coupled to the controller 113. The display 115 can be a liquid crystal display (LCD), a light emitting diode (LED) display, a plasma display, a cathode ray tube display, a touch screen display, or any other means for displaying information. The display 115 can be configured to provide the print job forwarding preference options to a user, where the print job forwarding preference options can include options for print job preferences based on printing device capabilities based on a specific print job.

For example, the display 115 can be configured to display a prioritized list of printing devices for forwarding the specific print job to, where the prioritized list can be prioritized based on which printing devices best match the at least one mandatory print job preference and the a least one desirable print job preference. The display 115 can also be configured to indicate which print job preferences each printing device on the list satisfies. The display 115 can also be configured to display device specific print job forwarding preference options for at least one printing device on the prioritized list and the print job preference module 114 can be configured to receive revised print job forwarding preferences based on the device specific print job forwarding preference options. For example, a user can modify the print job preferences for a given printing device based on capabilities of the given printing device.

The printing device 110 can include a user interface 116 coupled to the controller 113. The user interface 116 can include a keypad, buttons, a touch pad, a joystick, an additional display, a touch screen, or any other device useful for providing an interface between a user and an electronic device. The user interface 116 can be configured to receive print job forwarding preferences from a user and provide the print job forwarding preferences to the print job preference module 114.

The memory 117 can be a computer-readable medium. The computer-readable medium can be a computer-usable data carrier storing instructions. The instructions, when executed by the controller 113 can cause the controller 113 to control the printing device 110 by providing print job forwarding preference options, where the print job forwarding preference options include options for print job preferences based on other printing device capabilities. The instructions can also control the printing device 110 by receiving print job forwarding preferences at the printing device 110. The print job forwarding preferences can include at least one mandatory print job preference that specifies a mandatory printing device capability for a specific print job and include at least one desirable print job preference that specifies a desirable printing device capability for the specific print job. The instructions can also control the printing device 110 by determining whether the specific print job requires forwarding from the printing device to another printing device. The instructions can also control the printing device 110 by forwarding the specific print job for printing if the specific print job requires forwarding. The instructions can also control the printing device 110 to perform some or all other functions described herein above or below.

Embodiments can provide for assisting a user in finding a printer to forward a print job to. A user can to specify feature match policies for all features in the print job for a printer finding algorithm to employ. These policies can specify what features and feature values must match, optionally match, or can be ignored. After the find printers algorithm is run, all printers can be displayed to the user in a best to worst order. For each printer, the user can see which features and feature options were and were not successfully matched. In addition, a print ticket can be converted for the chosen printing device where no or minimal information loss occurs.

Embodiments can be applied to current job redirection procedures and may use client-to-device technologies, such as forward compatibility interfaces that can use set of common interfaces, with protocol definition, for client and device interactions based on common printing syntax and semantics. These interfaces can use a common print ticket for printing and faxing features. These interfaces can also use bi-directional status as a mechanism to get any device status and information, such as warnings and errors, job queues, tray contents, and other device status and information. These interfaces can also use device capabilities descriptions of printing device feature capabilities, both possible and current, including constraints on these features. These interfaces can also use a device and job management mechanism for modifying device information, such as by setting a device's policies, and canceling print jobs.

Some embodiments can enable a system administrator to specify feature matching policies to be employed when automatic job redirection is enabled. With automatic job redirection, a job can be redirected when certain system administrator-specified conditions are met, such as when a marking engine is jammed. With this invention, the system administrator can specify, for all major features, feature priorities and feature inclusion rules to be used in determining what printer to redirect a print job to.

For each of the major features, such as media size, media type, finishing, and color, the system administrator can specify policy rules for a printer determination algorithm. The setting can specify whether to ignore a feature, make a feature and its current value a must have, and/or include a feature and its value as best the matching can. A system administrator can also specify the priority of all such features. When the job feature-to-device capability matching algorithm executes, it can choose a printer that best matches these policy rules. If no possible printer exists that support all the must have features, a job may not be redirected.

Some embodiments can apply this concept for user-initiated print job redirection, such as when a user walks up to a local printing device and specifies a job should be forwarded to another printing device. With this workflow, a full analysis of the job's features contained in the job's print ticket can be performed and a job forwarding feature preferences window can be displayed to the user. This window can display each job feature with the inclusion options, such as ignore, must have, best you can, with a recommended value. Some features that are device-specific, such as paper tray and output bin, may only have an ignore option.

The user can then modify these settings based on their preferences. When all the preferences are set, the user can initiate a find printer operation. The find printer operation can return a prioritized list of printers that best meet the user's policy rules. In addition, the feature matching results for the currently selected printer can be displayed within the list. The feature matching results can provide information, such as: X of Y features matched, list of must have features not matched, and list of optional features not matched. If the feature is missing, it can be highlighted. If it is the feature option that is missing, the feature option can be highlighted. For feature options that are missing, the user can select an allowable option from the ones supported by the printing device. From the printer list, the user can choose which printer to forward the job to.

Some embodiments can provide a methodology for converting a print ticket so it prints correctly to the forwarded printing device. Currently, a print job ticket can be modified so it matches the capabilities of the receiving print device. These modifications include removing unsupported features and modifying unsupported feature options to a supported feature option, which can normally be an automatic selected value. Job ticket constructs can provide specifying which portions of a job ticket the receiving printing device must employ and which portions it can optionally apply.

One first job ticket modification can be to add an attribute that specifies the original printing device the job was submitted to, or created at for a copy job. Another job ticket modification can be to add an attribute that designates what features the receiving printing device can optionally apply. In conjunction with this change, a feature option can be added that specifies whether the optional feature is applicable only if the receiving printing device is in the original printing device's family. This optional attribute can allow the designation of device-specific features, such as output destination, to be applied when the print ticket is forwarded. A receiving printing device can apply all optional features that it comprehends and for which it supports the designated value. If it does not comprehend a feature or its value, the printing device can ignore it.

Another job ticket modification can be to support an "-original" extension for all features. For example, if the print ticket needs to modify a feature's attribute, a feature-original' can be added to the print ticket to capture the user's original feature option. The feature itself can be modified to the newly specified option. The 'feature-original' extension can provide better control for a forwarded job that was forwarded multiple times. If a user has forwarded the job to the a 2nd printing device and then chooses to forward the job to a 3rd printing device and the 3rd printing device supports the original feature option, the user interface can prompt to the user to specify if they should use the original value or the modified value.

As an example, a print job is submitted to a first printing device. At the first printing device, the user can choose to forward the job to a second printing device because the first printing device is currently printing a large job. The user can choose to make paper color, offset, and output bin optional. The user initially requested a media type of 'heavyweight,' but can change it to 'thick paper' if 'heavyweight' is not supported by the second printing device.

The converted job ticket can contain the original printing device attribute to designate the first printing device:

```
<original-printing-device syntax="name">first printing device
</original-printing-device>
    The list of optional features can include:
        <optional-features syntax="1setOf">
            <feature>media-color</feature>
            <feature>job-offset</feature>
            <feature
applyIfOriginatingDeviceFamily="true">output-bin</feature>
        </optional-features>
```

The media-type feature can be changed to 'thick-paper' and can include an '-original' form:

```
<media-type syntax="keyword">thick-paper</media-type>
<media-type-original
syntax="keyword">heavyweight</media-type-original>
```

Embodiments can provide a flexible mechanism for a user to specify which features and feature options are most relevant when finding a printing device to forward a job to. The display of the resultant feature discrepancies for a particular receiving printing device can provide clear, concise information on which features and feature options are not supported by the receiving printing device. The print ticket conversion methodology can provide an efficient way to specify which features and feature values 'must' be used and which ones 'may' be used without any loss of the original print ticket information.

Figure 2:
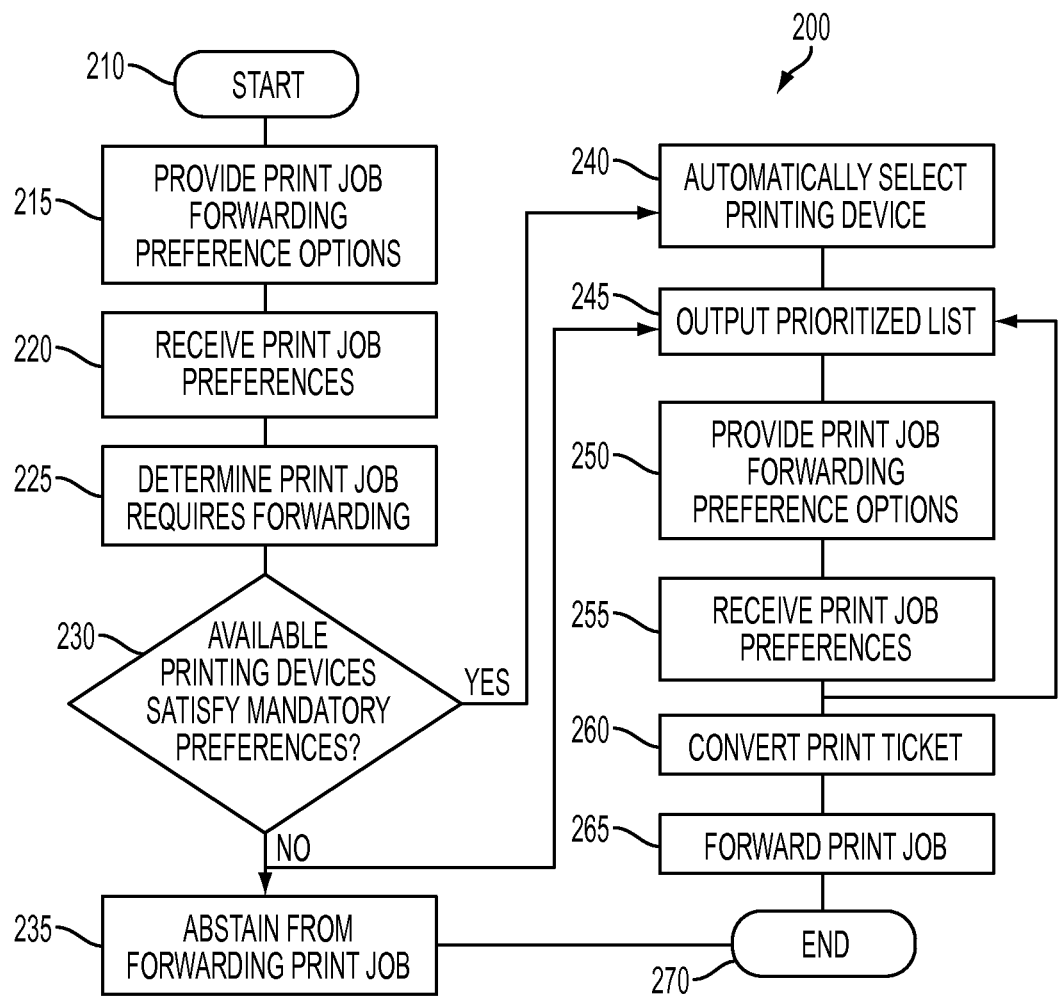
FIG. 2 illustrates an exemplary flowchart of a method of print job redirection in a printing device according to a possible embodiment.

FIG. 2 illustrates an exemplary flowchart 200 of a method of print job redirection in a printing device, such as the printing device 110, having a printing module configured to generate an image on media, a network interface configured to communicate with at least one other printing device, and a controller configured to control operations of the printing device. The method starts at 210. At 215, print job forwarding preference options can be provided to a user. The print job forwarding preference options can include options for print job preferences based on printing device capabilities. The print job forwarding preference options include at least one mandatory print job preference option and at least one desirable print job preference option. The print job forwarding preference options can be provided to a user, where the print job forwarding preference options can include options for print job preferences based on printing device capabilities based on a specific print job. For example, the print job forwarding preference options can be provided to a system administrator who can set up default values. Another user can then modify the values for their print job or the print job can be forwarded automatically. Alternately, the print job forwarding preference options can be provided to a user who sets them on their own.

At 220, print job forwarding preferences can be received at the printing device. For example, a user can input the print job forwarding preferences. The print job forwarding preferences can include at least one mandatory print job preference that specifies a mandatory printing device capability for a specific print job and can include at least one desirable print job preference that specifies a desirable printing device capability for the specific print job. The print job forwarding preferences can also include at least one ignore print job preference that specifies a printing device capability that can be ignored for a specific print job.

At 225, whether the specific print job requires forwarding from the printing device to another printing device can be determined. At 230, a determination can be made as to whether any available printing devices satisfy the at least one mandatory print job preference. If the specific print job requires forwarding and no available printing device satisfies the at least one mandatory print job preference, at 235, the specific print job may not be forwarded. Alternately, a user can be informed if no available printing devices satisfy the mandatory print job preferences, a list of devices that best match the preferences can be presented to the user at step 245, and the print job forwarding preference options can be presented or represented to the user at step 250 so the user can modify the print job forwarding preferences or select a printing device that best satisfies the desired print job forwarding preferences.

If the specific print job requires forwarding and an available printing device satisfies the at least one mandatory print job preference, at 240, a specific printing device can be automatically selected from a group of printing devices for forwarding the specific print job, where the specific printing device satisfies the at least one mandatory print job preference and best satisfies the at least one desirable print job preference from other printing devices in the group of printing devices. This step can be performed if a system administrator has set the print job preferences. Alternately, a user can select the specific printing device instead of having the specific printing device automatically selected or can select an alternate printing device.

At 245, a prioritized list of printing devices for forwarding the specific print job to can be displayed, where the prioritized list can be prioritized based on which printing devices best match the at least one mandatory print job preference and the a least one desirable print job preference. A user can also specify priorities for different preferences and the list can be organized according to which printing device satisfies the most and/or the highest priority print job preferences. While the method can output a list of printing devices to the user, the print job can be automatically forwarded based on which printing device satisfies the most and/or the highest priority print job forwarding preferences. For example, a system administrator can set the print job forwarding preferences to force which printing device the job will be forwarded to. Also, the prioritized list can indicate which print job preferences each printing device on the list satisfies. The list can further indicate which print job preferences each printing device on the list does not satisfy. For example, the list can identify which features are present and which are missing for each printing device on the list. The identification can be presented along with the list or can open for each printing device individually when a user selects the device. The user can then modify the print job preferences for a given printing device based on capabilities of the given printing device.

At 250, print job forwarding preference options can be provided to a user. The print job forwarding preference options can include options for print job preferences based on printing device capabilities and other features listed above and below. This can allow a user to modify the print job forwarding preference options. At 255, print job forwarding preferences can be received at the printing device as described above and below.

At 260, a print ticket can be converted from an original print ticket for the printing device to a forwarded print ticket for the another printing device, where converting the print ticket includes specifying, in the print ticket, the printing device as the original printing device. The print ticket can be converted from an original print ticket for the printing device to a forwarded print ticket for the another printing device, where converting the print ticket includes indicating, in the print ticket, which print job preferences are optional. The print ticket can be converted from an original print ticket for the printing device to a forwarded print ticket for the another printing device, where converting the print ticket includes including, in the print ticket, an original value of a feature along with a modified value of the feature if the feature is modified. Alternately, before converting the print ticket, the prioritized list can be re-output at 245 based on modified preferences and the suer can select a desired printing device or can further modify the preferences.

At 265, the specific print job for printing can be forwarded to a specific printing device if the specific print job requires forwarding and if the specific printing device satisfies the at least one mandatory print job preference. At 280, the method ends. According to some embodiments, all of the blocks of the flowchart 200 are not necessary. Additionally, the flowchart 200 or blocks of the flowchart 200 may be performed numerous times, such as iteratively. For example, the flowchart 200 may loop back from later blocks to earlier blocks. Furthermore, many of the blocks can be performed concurrently or in parallel processes.

Figure 3:
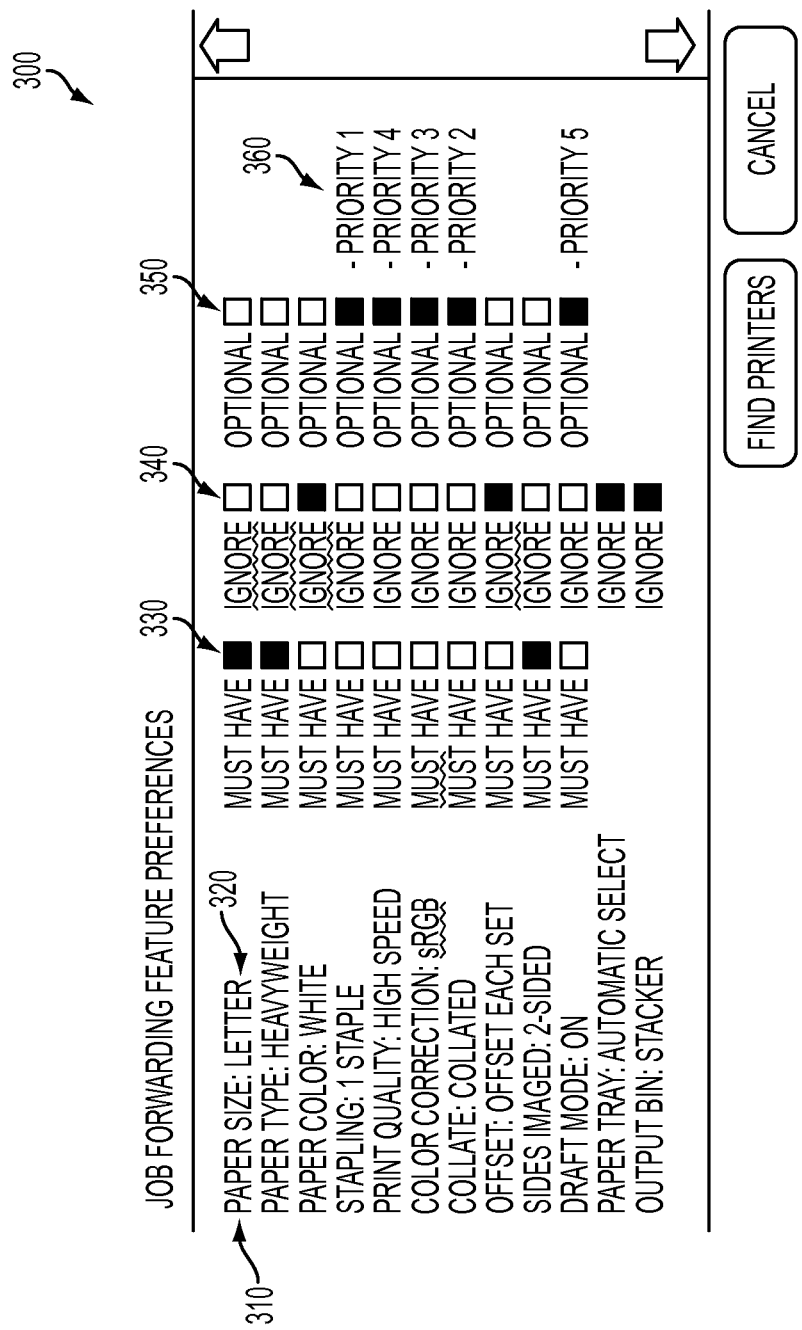
FIG. 3 is an exemplary illustration of print job forwarding preference options interface according to a possible embodiment.

FIG. 3 is an exemplary illustration of print job forwarding preference options interface 300 that can be provided to a user. The interface 300 can include printing device features 310. The interface 300 can also include print job forwarding preferences including printing device feature options 320, must have selection options 330, ignore selection options 340, optional selection options 350, and priorities 360 that can be assigned to the options. A user can select printing device feature options 320 for each printing device feature 310. A user can also select the importance of each printing device feature 310 and printing device feature options 320 using the options 330, 340, and 350. A user can further assign priorities 360 to the printing device features 310 and printing device feature options 320. An algorithm can then apply weights to the priorities 360 when determining which printing devices best satisfy the chosen options.

Figure 4:
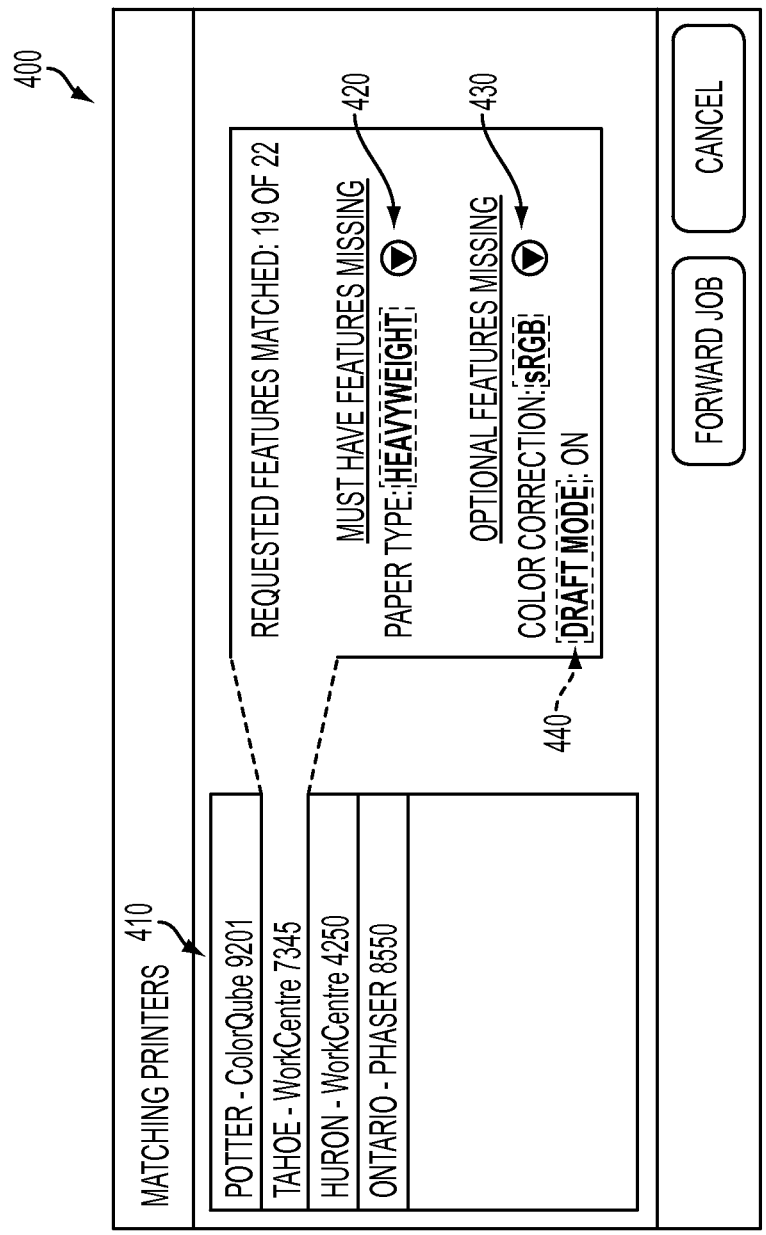
FIG. 4 is an exemplary illustration of a prioritized list of printing devices according to a possible embodiment.

FIG. 4 is an exemplary illustration of a prioritized list 400 of printing devices that can be provided to a user. The prioritized list 400 can display available printing devices 410. The printing devices 410 can be prioritized based on which printing devices best match chosen options. A user can select a printing device on the list 400 to find out which options the printing device includes and/or which options the printing device is missing. If a printing device is missing chosen options 420 and 430, these chosen options 420 and 430 can be highlighted and the user can be given the opportunity to modify the chosen options 420 and 430. The prioritized list 400 can also display missing features 440.

Figure 5:
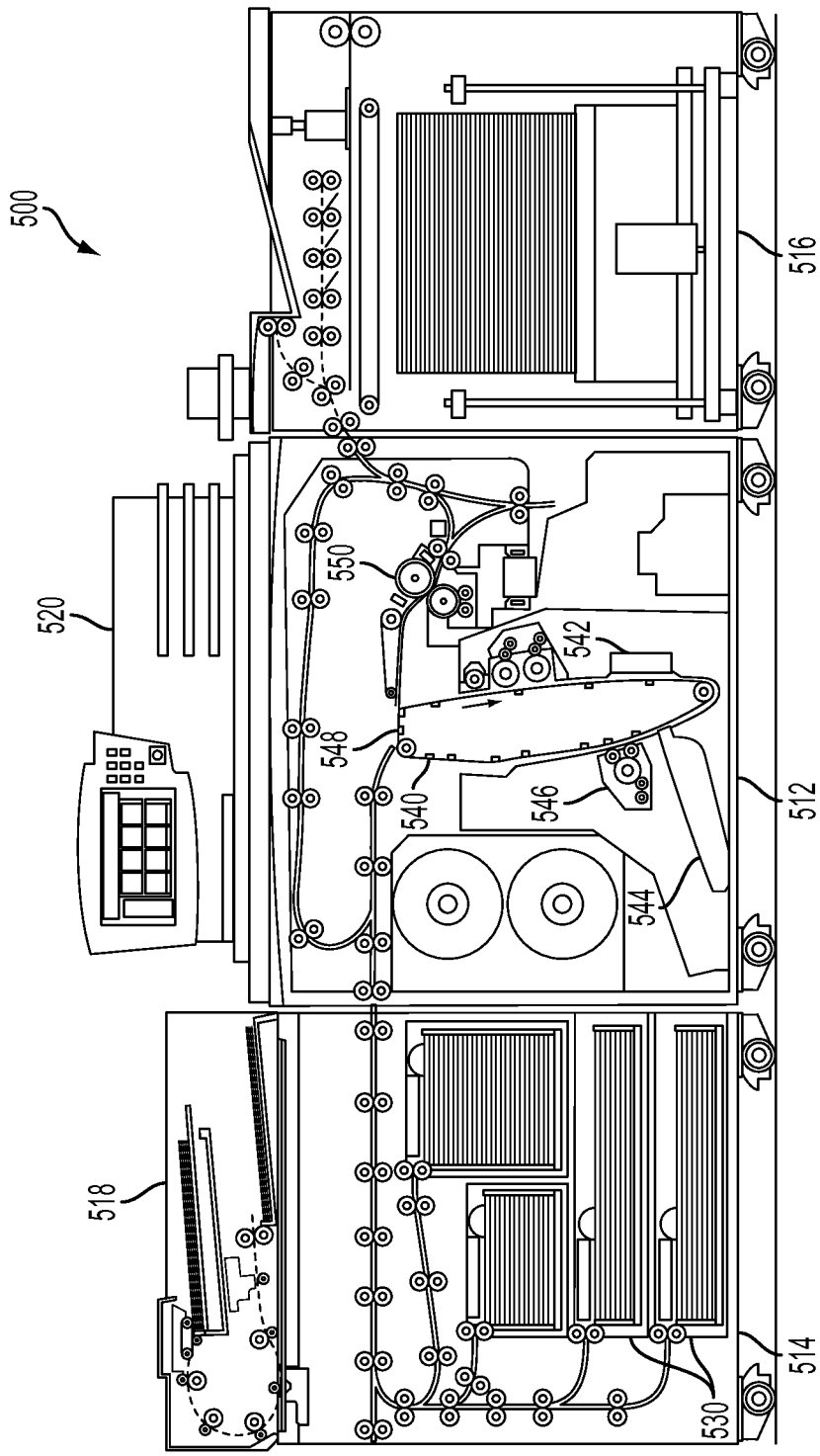
FIG. 5 is an exemplary diagram of an image production device according to a possible embodiment.

FIG. 5 is an exemplary diagram of an image production device 500, such as the printing device 110, in accordance with one possible embodiment of the disclosure. The image production device 500 may be any device, such as a copier, a printer, a multi-function device, or other device that may be capable of making image production documents, such as printed documents, copies, and/or other image production documents.

The image production device 500 can include a marking engine 512, which can include hardware by which image signals are used to create a desired image. The image production device 500 can include a feeder module 514, which can store and dispense sheets on which images are to be printed. The image production device 500 can include a finisher 516, which may include hardware for stacking, folding, stapling, binding, and/or otherwise finishing prints which are output from the marking engine 512. If the image production device 500 is also operable as a copier or multifunction device, the image production device 500 can include a document feeder 518, which can operate to convert signals from light reflected from original hard-copy image into digital signals, which can be processed to create copies with the marking engine 512. The image production device 500 may also include a local user interface 520 for controlling its operations, although another source of image data and instructions may include any number of computers connected to the image production device 500 via a network.

The feeder module 514 can include any number of trays 530, each of which can store media sheets of a selected stock or type, such as size, weight, color, coating, and/or transparency. Sheets drawn from a selected tray 530 are moved to the marking engine 512 to receive one or more images thereon.

The marking engine 512 can be any marking engine, such as monochrome xerographic, color xerographic, ionographic, ink-jet, or other marking engine. The marking engine 512 can include a photoreceptor 540, here in the form of a rotatable belt. The photoreceptor 540 is an example of what can be called a rotatable image receptor, meaning any rotatable structure such as a drum or belt which can temporarily retain one or more images for printing. Such an image receptor can comprise, by way of example and not limitation, a photoreceptor, or an intermediate member for retaining one or more ink, toner, or other marking material layers for subsequent transfer to a media sheet. The photoreceptor 540 can be entrained on a number of rollers, and a number of stations can be placed suitably around the photoreceptor 540. Such stations can include a charging station 542, an imaging station 544, a development station 546, and a transfer station 548. In an example embodiment, the imaging station 544 can be a laser-based raster output scanner in which a narrow laser beam scans successive scan lines oriented perpendicular to the process direction of the rotating photoreceptor 540. The laser can be turned on and off to selectively discharge small areas on the moving photoreceptor 540 according to image data to yield an electrostatic latent image, which can be developed with toner or other marking material at the development station 546 and transferred to a sheet at transfer station 548.

A sheet having received an image in this way can be subsequently moved through a fuser 550 and the heat and/or pressure from the fuser 550 can cause the toner image to become substantially permanent on the media sheet. For duplex or two-sided printing, the printed sheet can then be inverted and re-fed through the transfer station 548 to receive a second-side image. The finally-printed sheet can then be moved to finisher module 516, where it may be collated, stapled, folded, and/or otherwise finished with other media sheets.

Embodiments may be implemented on a programmed processor. However, the embodiments may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the embodiments may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the embodiments. For example, one of ordinary skill in the art of the embodiments would be enabled to make and use the teachings of the disclosure by simply employing the elements of the independent claims. Accordingly, the embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. Also, relational terms, such as "top," "bottom," "front," "back," "horizontal," "vertical," and the like may be used solely to distinguish a spatial orientation of elements relative to each other and without necessarily implying a spatial orientation relative to any other physical coordinate system. The term "coupled," unless otherwise modified, implies that elements may be connected together, but does not require a direct connection. For example, elements may be connected through one or more intervening elements. Furthermore, two elements may be coupled by using physical connections between the elements, by using electrical signals between the elements, by using radio frequency signals between the elements, by using optical signals between the elements, by providing functional interaction between the elements, or by otherwise relating two elements together. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

I claim:

1. A method in a printing device including a printing module configured to generate an image on media, a network interface configured to communicate with at least one other printing device, and a controller configured to control operations of the printing device, the method comprising:
    providing print job forwarding preference options by displaying the print job forwarding preference options to a user, wherein the print job forwarding preference options include options for print job preferences based on printing device capabilities;
    receiving print job forwarding preferences at the printing device by a user interface configured to receive forwarding preferences from a user, wherein the print job forwarding preferences include at least one mandatory print job preference that specifies a mandatory printing device capability for a specific print job and include at least one desirable print job preference that specifies a desirable printing device capability for the specific print job;
    determining whether the specific print job requires forwarding from the printing device to another printing device; and
    forwarding the specific print job for printing if the specific print job requires forwarding.

2. The method according to claim 1, wherein forwarding further comprises forwarding the specific print job to a specific printing device if the specific print job requires forwarding and if the specific printing device satisfies the at least one mandatory print job preference.

3. The method according to claim 1, further comprising automatically selecting a specific printing device from a group of printing devices for forwarding the specific print job, where the specific printing device satisfies the at least one mandatory print job preference and best satisfies the at least one desirable print job preference from other printing devices in the group of printing devices.

4. The method according to claim 1, further comprising abstaining from forwarding the specific print job if the specific print job requires forwarding and no available printing device satisfies the at least one mandatory print job preference.

5. The method according to claim 1, further comprising displaying a prioritized list of printing devices for forwarding the specific print job to, where the prioritized list is prioritized based on which printing devices best match the at least one mandatory print job preference and the a least one desirable print job preference.

6. The method according to claim 5, wherein outputting includes indicating which print job preferences each printing device on the list satisfies.

7. The method according to claim 1, wherein providing comprises providing print job forwarding preference options to a user, where the print job forwarding preference options include options for print job preferences based on printing device capabilities based on a specific print job.

8. The method according to claim 7, wherein the print job forwarding preference options include at least one mandatory print job preference option and at least one desirable print job preference option.

9. The method according to claim 1, further comprising converting a print ticket from an original print ticket for the printing device to a forwarded print ticket for the another printing device, where converting the print ticket includes specifying, in the print ticket, the printing device as the original printing device.

10. The method according to claim 1, further comprising converting a print ticket from an original print ticket for the printing device to a forwarded print ticket for the another printing device, where converting the print ticket includes indicating, in the print ticket, which print job preferences are optional.

11. The method according to claim 1, further comprising converting a print ticket from an original print ticket for the printing device to a forwarded print ticket for the another printing device, where converting the print ticket includes including, in the print ticket, an original value of a feature along with a modified value of the feature if the feature is modified.

12. The method according to claim 1, wherein the print job forwarding preferences include at least one ignore print job preference that specifies a printing device capability that can be ignored for a specific print job.

13. A printing device comprising:
    a printing module configured to generate an image on media;
    a network interface configured to communicate with at least one other printing device;
    a controller coupled to the printing module and the network interface, the controller configured to control operations of the printing device; and
    a print job preference module coupled to the controller, the print job preference module configured to provide print job forwarding preference options, where the print job forwarding preference options include options for print job preferences based on printing device capabilities and where the print job preference module is configured to receive print job forwarding preferences, where the print job forwarding preferences include at least one mandatory print job preference that specifies a mandatory printing device capability for a specific print job and include at least one desirable print job preference that specifies a desirable printing device capability for the specific print job,
    wherein the controller is configured to determine whether the specific print job requires forwarding from the printing device to another printing device and configured to forward the specific print job for printing if the specific print job requires forwarding;
    a display coupled to the controller, the display configured to provide the print job forwarding preference options to a user, wherein the print job forwarding preference options include options for print job preferences based on printing device capabilities based on a specific print job; and
    a user interface coupled to the controller, the user interface configured to receive print job forwarding preferences from a user and provide the print job forwarding preferences to the print job preference module.

14. The printing device according to claim 13, the display configured to display a prioritized list of printing devices for forwarding the specific print job to, where the prioritized list is prioritized based on which printing devices best match the at least one mandatory print job preference and the a least one desirable print job preference.

15. The printing device according to claim 14, wherein the display is configured to indicate which print job preferences each printing device on the list satisfies.

16. The printing device according to claim 14,
wherein the display is configured to display device specific print job forwarding preference options for at least one printing device on the prioritized list, and
wherein the print job preference module is configured to receive revised print job forwarding preferences based on the device specific print job forwarding preference options.

17. A non-transitory computer-readable medium, comprising:
a computer-usable data carrier storing instructions, the instructions, when executed by a controller, causing the controller to control a printing device by:
providing print job forwarding preference options by displaying the forwarding preference options to a user, wherein the print job forwarding preference options include options for print job preferences based on printing device capabilities;
receiving print job forwarding preferences at the printing device from a user by a user interface configured to receive print job forwarding preferences from a user, wherein the print job forwarding preferences include at least one mandatory print job preference that specifies a mandatory printing device capability for a specific print job and include at least one desirable print job preference that specifies a desirable printing device capability for the specific print job;
determining whether the specific print job requires forwarding from the printing device to another printing device; and
forwarding the specific print job for printing if the specific print job requires forwarding.

18. The non-transitory computer-readable medium according to claim 17, wherein the instructions further comprise instructions causing the controller to control a printing device by displaying a prioritized list of printing devices for forwarding the specific print job to, where the prioritized list is prioritized based on which printing devices best match the at least one mandatory print job preference and the a least one desirable print job preference.

19. The non-transitory computer-readable medium according to claim 17, wherein providing comprises providing print job forwarding preference options to a user, where the print job forwarding preference options include options for print job preferences based on printing device capabilities based on a specific print job.

* * * * *